United States Patent [19]

Freeman

[11] 4,271,898
[45] Jun. 9, 1981

[54] ECONOMIZER COMFORT INDEX CONTROL

[76] Inventor: Edward M. Freeman, 3214 Leyte Dr., San Antonio, Tex. 78217

[21] Appl. No.: 36,514

[22] Filed: May 7, 1979

Related U.S. Application Data

[63] Continuation-in-part of Ser. No. 810,052, Jun. 27, 1977, Pat. No. 4,167,966.

[51] Int. Cl.³ ............................................. F25B 29/00
[52] U.S. Cl. ....................................... 165/16; 165/26; 165/27; 62/176 E; 62/186; 236/44 C; 236/DIG. 9
[58] Field of Search ........................ 165/3, 21, 26, 27; 236/44 R, 44 A, 44 C, 11, DIG. 9; 62/176 R, 176 E, 180, 186

[56] References Cited

U.S. PATENT DOCUMENTS

| | | | |
|---|---|---|---|
| 3,070,972 | 1/1963 | Atchison | 62/180 |
| 3,454,078 | 7/1969 | Elwart | 165/27 |
| 3,785,433 | 1/1974 | Ballard | 165/27 |
| 3,877,243 | 4/1975 | Kramer | 62/180 |
| 3,989,097 | 11/1976 | Schildknecht | 165/21 |
| 4,210,278 | 7/1980 | Obler | 236/44 C X |

FOREIGN PATENT DOCUMENTS 2348253  4/1975  Fed. Rep. of Germany ........ 236/44 C Primary Examiner—Albert W. Davis
Assistant Examiner—Margaret A. Focarino

[57] ABSTRACT

A control circuit for a typical home heating and cooling system, including means to control relative humidity, is shown. The control circuit includes a standard 24 volt transformer in conjunction with a thermostat selector switch and a fan selector switch. As is common in many heating and cooling systems, a multiple speed blower is included with the higher speed being used during the cooling cycle. In addition to the standard relay for normal operation of the multiple speed blower motor in the typical home heating and cooling system, the control circuit includes an economizer control relay which activates when the thermostat selector switch is in the cool position and the fan selector switch is ON to cause the blower motor to run at a high speed while the compressor is running and at a low speed while the compressor is not running. The relative humidity control means makes the central air conditioning control system responsive to relative humidity (RH) as well as temperature, thereby maintaining an acceptable nighttime "Comfort Index" while reducing energy usage by the air conditioning system as much as thirty-five percent.

6 Claims, 2 Drawing Figures

ECONOMIZER COMFORT INDEX CONTROL

REFERENCE TO RELATED APPLICATION

This application is a continuation-in-part of applicant's copending application Ser. No. 810,052, filed on June 27, 1977, now U.S. Pat. No. 4,167,966

BACKGROUND OF THE INVENTION

This invention relates to a control circuit for a home heating and air conditioning system and, more particularly, to providing multiple speed capability to the home heating and cooling unit with a significant savings in energy during the cooling season.

When applied to the ambient atmosphere, the term "Comfort Index" identifies a blend of airflow, relative humidity and temperature. This invention relates to managing the second most important factor of said "Comfort Index", namely, relative humidity, and more particularly to reducing excessive nighttime relative humidity without lowering the thermostat set point below the nighttime outdoor temperature in order to activate the cooling cycle of the air conditioning system with energy savings of as much as thirty-five percent.

DESCRIPTION OF THE PRIOR ART

In the past, home heating and cooling systems have had one centralized control unit with a thermostat selector switch that may be positioned in the heat, cool or OFF position. Also, a fan selector switch is normally located in the centralized control unit with the fan either being turned to the automatic position or to the ON position. The thermostat, which normally indicates if either heating or cooling is necessary, is normally located within the centralized control unit. During the heating season, if the fan selector switch is on automatic, the evaporator fan relay causes the blower to operate at a lower speed during the heating cycle. During the cooling season, if the thermostat selector switch is in the cool position and the fan selector switch is in the automatic position, upon the thermostat calling for cooling, an evaporative fan relay is activated to switch the multiple speed blower motor to a high speed. This allows for maximum heat transfer from the evaporator coils to the cooled space due to the large volume of air flow over the evaporator coils during the operation of the compressor. If the fan selector switch is in the ON position when the thermostat selector switch is in either the heat or the cool position, then the multiple speed blower motor will continue to operate at high speed regardless of whether or not the thermostat is calling for heat or cooling.

Current design air conditioning systems do nothing but cool the air to a temperature prescribed by the setting of a control thermostat. The air conditioning system dehumidifies the air passing through it during the cooling process. During the "Off" cycle they accomplish nothing, and the relative humidity inside the conditioned space increases to that of the outside relative humidity unless and until a temperature rise causes the thermostat to reinstitute the cooling cycle. During nighttime hours across a large portion of this country, relative humidity averages 90% or more with accompanying outdoor temperatures of 70°-75° Fahrenheit. This excessive relative humidity neutralizes the body's ability to dissipate its heat by means of its vasomotor process. While this condition is unacceptable to most people, it is intolerable to those afflicted with cardiac and/or pulmonary disorders.

The current alternative is to lower the control thermostat set point to a level below that of the outside temperature in order to activate the air conditioning system and dehumidify the ambient atmosphere. This is doubly inefficient in that the Department of Energy advises that a 72° Fahrenheit thermostat setting uses 46% more energy than does a 78° Fahrenheit thermostat setting; furthermore, a given atmosphere at 78° Fahrenheit has a 40% lower relative humidity than that same atmosphere at 72° Fahrenheit and is therefore 40% more efficient at evaporating the insensible perspiration the body uses to dissipate its heat.

A properly charged and operating air conditioning evaporator will lower the temperature of the air passing over it approximately 20° Fahrenheit. This temperature drop precipitates excessive moisture from that air, causing the excess moisture to flow out of the premises by way of a condensate drain. When the cooled air expands into the conditioned space, its relative humidity approximates 50%, and when it mixes with the air in the space acts to reduce the relative humidity of the total air within the space. The degree to which this is reduced depends upon the length of time the air conditioning system runs with 50% being the lowest relative humidity the air conditioning system can achieve.

The precipitation of the excess moisture occurs as soon as the air comes in contact with the cold evaporator, and the relative humidity of the total air volume within the conditioned space can be lowered 5%-10% in a very short time, without lowering the ambient temperature of the space more than one degree Fahrenheit.

SUMMARY OF THE INVENTION

It is an object of the present invention to provide a home heating and cooling system with multiple speed capabilities during the cooling cycle, including means to control relative humidity.

It is another object of the present invention to provide a control unit for a home heating and cooling system wherein the blower motor is operated continuously during the cooling season with the blower motor operating at a low speed when the compressor is OFF and at a high speed when the compressor is ON.

It is another object of the present invention to provide an energy saving modification for a home heating and cooling system wherein the blower motor is continuously operated at a low speed when the compressor is OFF thereby providing continued air circulation inside of the cooled area to eliminate hot air pockets and provide continued air circulation. The continued air circulation will result in the body feeling comfortable at a higher temperature due to air circulation over the skin. Therefore, the higher setting of the thermostat results in a decrease in the operation time of the compressor which is the major power consumer in the air conditioning system.

It is even another object of the present invention to modify the control unit of an existing heating and cooling system having a multiple speed blower motor. The existing heating and cooling system would include a thermostat selector switch having a heat, cool and OFF position, a fan selector switch and a thermostat. An economizer control relay is connected through the cool contact of the thermostat and the cool contact of the thermostat selector switch across a 24 volt transformer to energize the economizer control relay. Energization of the economizer control relay will open a normally closed contact connected to the low speed terminal of the multiple speed blower motor, and close a normally opened contact connected to the high speed connection of the multiple speed blower motor. By having the fan selector switch in the ON position, the evaporator fan relay is energized thereby allowing power to be continuously supplied to the normally open and normally closed contacts of the economizer control relay. Therefore, when the thermostat moves to the cool position, the contactor relay is energized to turn ON the compressor, and the economizer control relay will also be activated to switch the multiple speed blower motor from a low speed to a high speed. The normal operation of the heating cycle is not changed.

A still further object of the present invention is to provide a means of controlling the relative humidity of the nighttime ambient atmosphere without the excessive energy waste of currently used air conditioning controls.

Another object of the present invention is to create and maintain an acceptable comfortable blend of air flow, relative humidity and temperature as an energy saving modification to either existing or newly manufactured air conditioning systems.

It is even another object of the present invention to activate the air conditioning system whenever the relative humidity of the atmosphere within the conditioned space rises above the control set point, regardless of the temperature thermostat set point, and to deactivate the air conditioning system whenever the relative humidity of the conditioned space drops below the control set point, unless there exists a condition of temperature in the space above that of the thermostat control set point. At no time will this modification interfere with the activity of the temperature thermostat in its cooling function. In conditions of lower relative humidity as is usual during afternoon daytime hours, all cooling cycle functions will be controlled by the control thermostat.

DESCRIPTION OF THE SPECIFIC EMBODIMENTS

Figure 1:
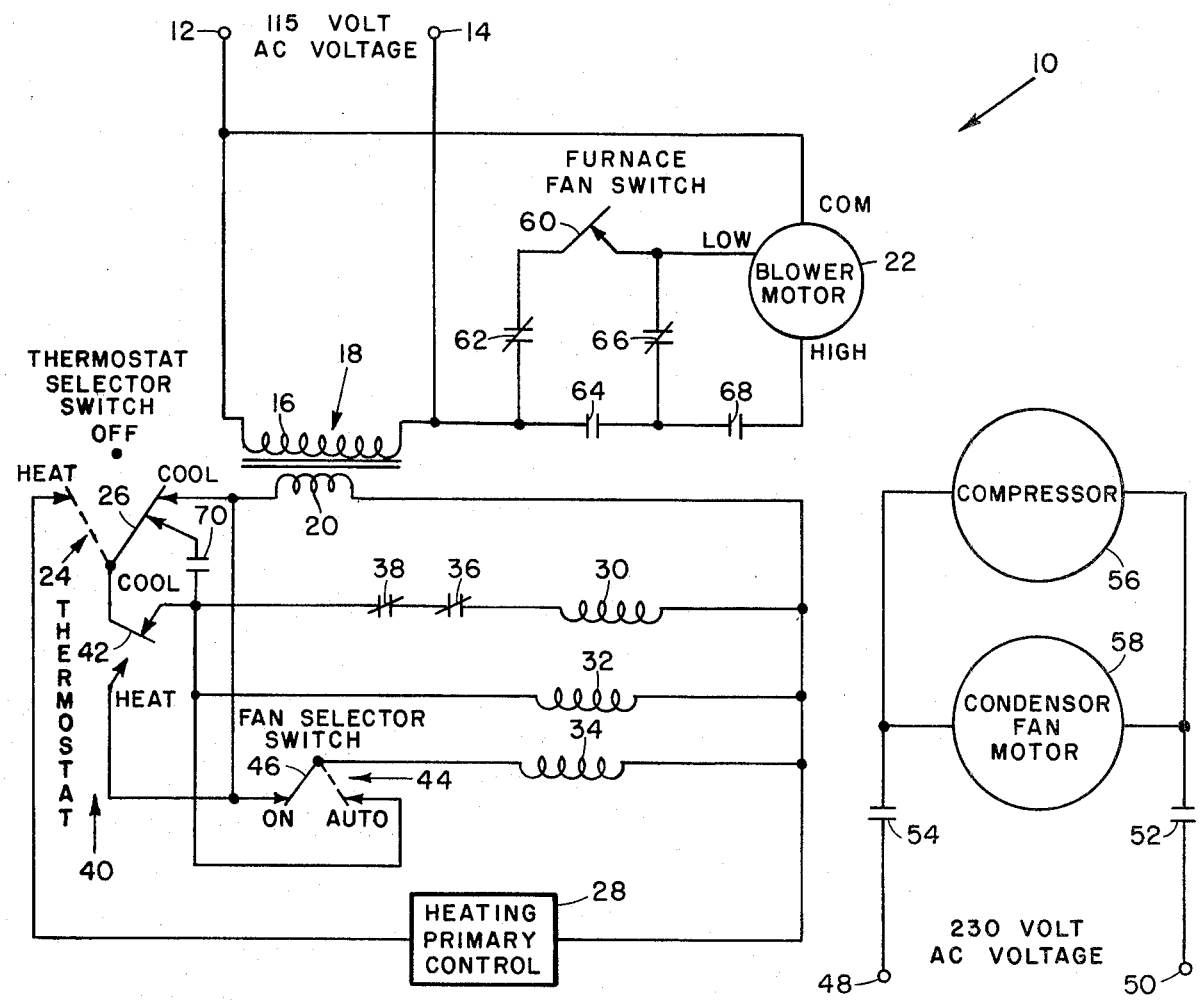
FIG. 1 is a schematic illustration of an economizer comfort index control of the present invention.

Referring to the drawings, a typical control unit for a home heating and cooling system embodying the present invention is shown in FIG. 1. The control unit embodying the present invention is represented generally by reference numeral 10. A 115 volt rms AC voltage is supplied through the input terminals 12 and 14 to primary winding 16 of a stepped-down transformer 18 with the voltage across the secondary winding 20 typically being 24 volts. Also connected to input terminal 12 is a common lead from multiple speed blower motor 22. High and low speed connections of the multiple speed blower motor 22 connect through relay contacts and a furnace fan switch 60 to input terminal 14 as will be subsequently explained in more detail.

A secondary winding 20 of a transformer 18 connects to the cool contact of a thermostat selector switch 24 having a wiper arm 26. The wiper arm 26 may be manually adjusted from the cool position to a center OFF position or to a heating position. In the heat position, the wiper arm 26 connects to a heating primary control 28. While the heating primary control 28 is not explained in detail herein, it would include the typical elements, such as a pilot light, gas valve, and other controls not specifically shown herein. The heating primary control 28 connects to the opposite side of the secondary winding 20.

Connected to the same side of the secondary winding 20 as the heating primary control 28 is contactor coil 30, economizer control relay 32 and evaporator fan relay 34. The opposite side of contactor coil 30 connects through a normally closed, low pressure switch 36 and a normally closed, high pressure switch 38 to the cool contact of thermostat 40. Thermostat 40 has a wiper arm 42 which may be of a typical bimetal construction. Also connected to the cool contact for the thermostat 40 is one side of economizer control relay 32. The heat contact for thermostat 40 connects directly to one side of the secondary winding 20 of the transformer 18. The ON contact of a fan selector switch 44 also connects to the heat contact of thermostat 40 and the same side of the secondary winding 20. The wiper arm 46 of the fan selector switch 44 may be in the ON or automatic position. The wiper arm 46 of fan selector switch 44 is connected to one side of evaporator fan relay coil 34.

Connected to terminals 48 and 50 is a suitable 230 volt rms AC voltage which is fed to normally open relay contacts 52 and 54 of contactor coil 30. The opposite side of the normally open relay contacts 52 and 54 are connected to each respective side of a parallel connection for a compressor 56 and a condenser fan motor 58.

During the normal operation of the control unit 10 in the heating season, the wiper arm 26 of the thermostat selector switch 24 is in the heat position. If the wiper arm 46 of the fan selector switch 44 is in the automatic position, upon the wiper arm 42 of thermostat 40 moving to the heat position thereby indicating additional heat is necessary, one side of the secondary winding 20 will be connected through the wiper arm 42 of the thermostat 40 and the wiper arm 26 of thermostat selector switch 24 to supply energy to the heating primary control 28. The supplying of voltage to the heating primary control 28 causes the furnace to start the heating process. Once the temperature inside of the furnace has reached a predetermined point, the furnace fan switch 60 will close. Because the evaporator fan relay coil 34 is not energized, 115 volts AC is fed through the normally closed relay contact 62 and the furnace fan relay 60 to the low speed side of blower motor 22 thereby causing the blower motor 22 to operate at a low speed. When the thermostat 40 has sensed that the room temperature is at the desired level, the wiper arm 42 will move to the cool position thereby removing the energy being supplied to the heating primary control 28 to shut OFF the furnace. However, the furnace fan switch 60 will not open until temperature inside of the furnace has decreased below the amount preset in the furnace fan switch 60.

If the wiper arm 46 of the fan selector switch 44 is in the ON position, then the evaporator fan relay coil 34 is energized and opens normally closed relay contact 62 and closes normally open relay contact 64. Since the economizer control relay coil 32 can never be energized when the wiper arm 26 of the thermostat selector switch 24 is in the heat position, 115 volts AC will be supplied between the low speed terminal and common of blower motor 22 via normally open relay contact 64 of evaporator fan relay coil 34 and normally closed relay contact 66 of economizer control relay coil 32. In this case, operation of the furnace fan switch 60 in the thermostat 40 will have no effect on the low speed operation of blower motor 22.

Assume now that the wiper arm 26 of the thermostat selector switch 24 is in the cool position. If the wiper arm 46 of the fan selector switch 44 is in the automatic position, the evaporator fan coil 34 will be energized upon the wiper arm 42 of the thermostat 40 moving to the cool position. By energization of the evaporator fan relay coil 34, the normally open relay contact 64 would close thereby supplying 115 volts AC through either normally closed relay contact 66 or normally open relay contact 68 of economizer relay coil 32. It should be realized that the furnace fan switch 60 remains open during the entire cooling season.

Since the economizer control relay coil 32 also connects through wiper arm 42 of thermostat 40 when the wiper arm 42 is in the cool position, and the wiper arm 26 of the thermostat selector switch 24 to the secondary winding 20 of the transformer 18, the economizer control relay coil 32 is energized which causes normally closed relay contact 66 to open and normally open relay contact 68 to close. Therefore, each time the evaporator fan relay coil 34 is energized (with the fan selector switch remaining in the automatic position), so is the economizer control relay coil 32 therefore supplying 115 volts AC via normally open relay contacts 64 and 68 to the high speed terminal of multiple speed blower motor 22.

If the refrigerant in the compressor 56 has the necessary charge, normally closed, low pressure switch 36 will remain closed. Also, the normally closed, high pressure switch 38 will remain closed if the compressor 56 is not overcharged, does not overheat or otherwise malfunction causing the switch to open. Therefore, during normal operation, switches 36 and 38 will be closed and contactor coil 30 will be energized upon movement of the wiper arm 42 of thermostat 40 to the cool position if the wiper arm 26 of thermostat selector switch 24 is also in the cool position. Upon the thermostat 40 calling for cooling by movement of wiper arm 42 to the cool position, the contactor coil 30 will be energized and the normally open relay contacts 52 and 54 closed. The closing of the normally open relay contacts 52 and 54 connects the 230 volts received at terminals 48 and 50 across the compressor 56 and the condensor fan motor 58. The position of the fan selector switch 44 has no effect on the operation of the contactor coil 30.

Assume now that the wiper arm 46 of the fan selector switch 44 is moved to the ON position. Evaporator fan relay coil 34 will remain continuously energized thereby opening normally closed relay contact 62 and closing normally open relay contact 64. Therefore, when the wiper arm 42 of thermostat 40 is in the heat position and the wiper arm 26 of the thermostat selector switch 24 is in the cool position, the economizer control relay coil 32 is not energized. When the economizer control relay coil is not energized, 115 volts will be connected to the low speed terminal of multiple speed blower motor 22 via normally closed relay contact 66 and normally open relay contact 64. Upon the wiper arm 42 of the thermostat 40 moving to the cool position indicating cooling is necessary, both the contact coil 30 and the economizer control relay coil 32 are energized. Energization of the economizer control relay coil 32 will open normally closed relay contact 66 and close normally open relay contact 68 thereby applying voltage to the high speed terminal of the multiple speed blower motor 22. Simultaneously, the compressor 56 is energized. Therefore, by inclusion of the economizer control relay 32 with its respective normally closed relay contact 66 and normally open relay contact 68, the multiple speed blower motor 22 is operated at a low speed when cooling is not required and at a high speed when cooling is required. During the heating season, the economizer relay coil 32 and its relay contacts 66 and 68 will have no effect on the normal operation of the heating and cooling system.

By use of the economizer control relay coil 32, the multiple speed blower motor 22 can be continuously operated during the cooling season at a low speed when cooling is not required thereby insuring a continued air circulation in the cooled area. The continued air circulation prevents hot air pockets, and causes individuals located inside the cooled area to sense the moving air over their bodies. The moving air over an individual's body tends to increase the temperature at which an individual is comfortable thereby resulting in high settings for the thermostat 40. Since the compressor 56 is in the main source of energy drain, by the decreasing the ON time for the compressor 56 by higher settings of the thermostat 40 results in a substantial energy savings even though the blower motor 22 is continuously operated at a low speed when the compressor 56 is OFF. The multiple speed blower motor 22 must operate at a high speed when the compressor is ON to insure the maximum heat transfer through the evaporator coil (not shown) and the vaporization of the refrigerant contained therein.

The economizer circuit of the subject invention comprises normally open, humidity limiting switch 70 which is in parallel with temperature sensitive thermostat switch 42 and is hygroscopically calibrated to close on the increase of relative humidity above a pre-set point and to open on the decrease of relative humidity below that same pre-set point. More specifically, thermostat switch 42 heretofore mentioned activates the condensing unit by energizing contacts 52 and 54 and switches 115 AC voltage from the low speed tap of blower motor 22 to the high speed tap. This economizer circuit operates independently of temperature sensitive switch 42 and while either circuit can initiate the cooling cycle neither will interfere with the other. The cooling cycle will be initiated whenever the ambient temperature exceeds the thermostat set point or whenever the relative humidity (RH) of the ambient atmosphere exceeds the control set point.

For example, assume that wiper arm 26 of thermostat 40 is in the cool position, fan switch 46 is in the ON position, the thermostat set point at 78° Fahrenheit, and the humidity limiting switch 70 set at 70% RH. During the nighttime hours there generally occurs a decrease in outdoor temperature with a corresponding increase in relative humidity. For so long as the relative humidity remains below the pre-set point of 70% and the temperature remains below 78° Fahrenheit, the only activity taking place in the air conditioning system would be blower motor 22 operating at low speed. If the relative humidity within the conditioned space should rise above the 70% control point, normally open switch 70 closes picking up voltage from the secondary winding of transformer 20 by means of wiper arm 26 and supplying that voltage to contactor coil 30 and economizer coil 32. Coil 30 closes contactors 52 and 54 initiating start up of compressor 56 and condensor fan motor 58;

economizer coil 32 opens normally closed relay 62 and closes normally open relay 68 and switches the 115 AC voltage from the low speed terminal of blower motor 22 to the high speed terminal and the cooling cycle mode would be complete.

When the temperature drop of the air crossing the evaporator coil precipitates enough of the excess moisture from the air to reduce the mix of all of the air within the conditioned space to or below 70% RH, humidity switch 70 will open thereby de-energizing coils 30 and 32. Contactors 52 and 54 open thereby shutting down the condensing unit, relay 68 reverts to its normally open position and relay 66 reverts to its normally closed position. In this manner the 115 AC voltage will shift from the high speed winding of blower motor 22 to the low speed winding of motor 22.

In the event of a temperature increase without excess humidity, the same sequences would be controlled by the closing of wiper arm 42 on the temperature rise and the opening of wiper arm 42 on the temperature drop.

Figure 2:
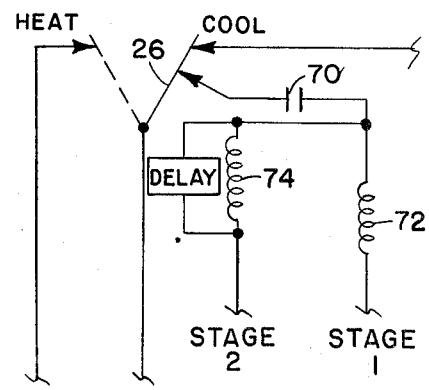
FIG. 2 is a fragmentary, schematic illustration of a modification of the invention.

In those systems using staged cooling by use of either two compressors or a two speed compressor, humidity limiting switch 70 upon closing could be connected to energize only the first stage, generally of sufficient efficiency to reduce relative humidity. In combination heating and cooling heat pump installations, where compressor 56 is used in a heat pump mode, humidity limiting switch 70 is wired to energize the first stage (see FIG. 2) which activates the unit's switch-over valve 72 and simultaneously feeds a 5-10 second time-delay switch 74 to energize stage two which activates compressor 56 and condensor fan motor 58.

It should be understood, of course, that the foregoing disclosure relates to only preferred embodiments of the invention and that it is intended to cover any changes and modifications of the invention herein chosen for the purposes of the disclosure which do not constitute departures from the spirit and scope of the invention.

What is claimed is:

1. In a home type heating and cooling system having a blower motor with at least two speeds, a common terminal of said blower motor being connected to a first side of a line voltage, stepped-down transformer means for reducing said line voltage to thermostat control means which includes a thermostat selector switch operatively connected to a secondary winding of said stepped-down transformer, a thermostat operatively connected to said thermostat selector switch to indicate if heating or cooling is desired, a fan selector switch having automatic and ON positions and being connected to said secondary winding, contactor relay means energized by said secondary winding via said thermostat and said thermostat selector switch if both call for cooling thereby connecting a compressor means and condenser fan means to said line voltage, heating control means connected to said thermostat selector switch to operate furnace means for heating if said thermostat and said thermostat selector switch call for heating, evaporator fan relay means connected to said fan selector switch and said secondary winding, the improvement comprising:

economizer control relay coil means connected to said secondary winding and said thermostat for energization if said thermostat and said thermostat selector switch both call for cooling, said economizer control relay coil means switching said blower motor from low speed to high speed if said fan selector switch is in said ON position, and means in combination with said economizer control relay coil to control relative humidity in a conditioned air space.

2. The invention of claim 1 wherein said relative humidity control means comprises a hygroscopically calibrated, normally open relay.

3. The invention of claim 2 wherein said relative humidity control means is in parallel with said thermostat control means.

4. The invention of claim 1 utilizing first and second stage cooling means wherein said relative humidity control means activates said first stage of said cooling means.

5. The invention of claim 1 utilizing a heat pump for heating and cooling, said heat pump comprising a switch-over valve and the cooling mode consisting of first and second stages, said switch-over valve intermediate said heating mode and cooling mode of said first stage, said second stage activating the cooling cycle; said relative humidity control means connected to said first stage and through a 5-10 second time delay switch to said second stage.

6. The invention of claim 1 wherein said relative humidity control means is activated above a pre-set relative humidity and deactivated when the pre-set relative humidity is attained, said relative humidity control means independent of said thermostat control means.

* * * * *